United States Patent [19]

Grusa

[11] 4,303,358

[45] Dec. 1, 1981

[54] BORING TOOL WITH A PLURALITY OF CUTTER CHIPS

[75] Inventor: Arnold Grusa, Ammerbuch-Entringen, Fed. Rep. of Germany

[73] Assignee: Montanwerke Walter GmbH, Tübingen, Fed. Rep. of Germany

[21] Appl. No.: 158,216

[22] Filed: Jun. 10, 1980

[30] Foreign Application Priority Data

Jun. 30, 1979 [DE] Fed. Rep. of Germany ....... 2926462

[51] Int. Cl.³ ....................... B23B 51/00; B26D 1/12
[52] U.S. Cl. ................................ 408/223; 408/227; 408/229; 408/713; 407/43; 407/46
[58] Field of Search .............. 408/186, 189, 199, 223, 408/224, 227, 228, 229, 230, 231, 713, 206; 407/36, 37, 43, 44, 45, 46, 47, 48, 49

[56] References Cited

U.S. PATENT DOCUMENTS

| | | | |
|---|---|---|---|
| 3,303,728 | 2/1967 | Testa | 407/43 |
| 3,643,310 | 2/1972 | Kilbourne et al. | 407/36 |
| 4,033,018 | 7/1977 | Bloink | 407/49 |
| 4,108,567 | 8/1978 | Faber | 408/206 |
| 4,124,328 | 11/1978 | Hopkins | 408/223 |
| 4,201,500 | 5/1980 | Kralow et al. | 407/43 |

*Primary Examiner*—Harrison L. Hinson

*Attorney, Agent, or Firm*—Frishauf, Holtz, Goodman & Woodward

[57] ABSTRACT

To reduce the requirement for stocking different types of holder plates for cutting chips 9, at least the chip holder plate 16 carrying the radially outermost chip, and the next adjacent chip holder plate 6 carrying the radially more inwardly positioned chip, have mutually engaged common abutment surfaces 19, 27. The tool body 1 is formed with a recess 5 in which the radially outermost chip holder plate and the next adjacent plate are commonly secured, for example by clamping bolts or screws extending inwardly into the tool body at an angle with respect to the tool body axis 26. All of the radially inwardly positioned chip holder plates 6 are of equal size and shape. The boring or drilling diameter of the tool is defined by the width of the radially outermost chip holder plate and the chip positioned thereon. The radially outermost chip holder plate, preferably, is provided with surface deformations in a zone 20 adjacent the abutment surface 27 thereof so that the size of the radially outermost chip holder plate 16 can be reduced, for example by grinding, to thereby permit adjustment of the cutting diameter of the tool. It is then only necessary to stock two chip holder plates, namely of the radially inwardly positioned type 6, and the radially outwardly positioned type 16, the latter of maximum size for reduction, as required.

9 Claims, 12 Drawing Figures

BORING TOOL WITH A PLURALITY OF CUTTER CHIPS

The present invention relates to a machine tool, and more particularly to a boring or drilling tool which has a tool body on which a plurality of cutter bits are secured.

BACKGROUND AND PRIOR ART

Machine tools of this type, hereinafter for short "boring tools", for metallic or plastic workpieces are well known. They usually comprise a tool body on which a plurality of cutter chips are located. To secure the cutter chips to the tool body, the cutter chips have a hole through which a clamping bolt is passed. For positive positioning of the cutter bits, it has previously been proposed to utilize chip holder plates which are inserted in the tool body, the cutter bits then being secured to the chip holder plate. The chip holder plates, themselves, are screw-connected to the tool body. The cutter bits are so arranged on the tool body that their cutting range overlaps. The radially outermost cutter bit has a cutting corner which defines the maximum diameter of the hole being drilled or bored. The radially innermost cutter bit has a cutting edge which extends beyond the axis of the workpiece.

Boring tools of this type have been described in German Utility Model Publication DE-GM No. 70 24 898. Placing the cutter chips on separate chip holding plates protects the tool holding body if the cutter chips should become damaged. The chip holding plates, of course, being small elements are readily replaceable and much less expensive than the tool body. The tool holding plates can be made in various forms and are usually different in different types of boring tools. They may be semicylindrical or in the form of a circular segmental plate. Stocking different chip holder plates requires substantial storage space and inventory. It has been customary to make boring tools to size for particular diameters which, in turn, requires chip holder plates associated with specific boring tools of specific diameters, further increasing the inventory and storage problems since, practically for every different diameter, a separate tool body was necessary and, for each separate tool body, the holder plates has to be made and stored.

THE INVENTION

It is an object to provide a boring tool which can be used for holes of varying diameters without the requirement to stock a large number of different chip holder plates.

Briefly, in accordance with the invention, the chip holder plate carrying the radially outermost cutter chip is so arranged that it, in common with an associated tool holder plate, has adjacent mutually engaged abutment surfaces. The body is formed with a recess in which the radially outermost chip holder plate and possibly additional holder plates are commonly secured. The chip holding plates for the radially more inwardly positioned cutter chips are all the same. The diameter of cut which the tool can carry out is determined by the dimension of the radially outermost chip holding plate on which the radially outermost chip is secured.

The arrangement permits the use of boring tool bodies which can cut holes of various diameters, and stocking only of two types of holding plates, of which one type is for the radially inner chip holding plates, and the other type is for the radially outermost chip holding plates. The radially outermost chip holding plates can be stocked in various sizes, if necessary, to cooperate always with the radially inner chip holding plates which, as defined, are always the same. Preferably, and in order to vary the cutting radius, the radially outermost chip holder plates can be so arranged that they have a portion which can be severed or readily removed in order to vary their width, for example in predetermined steps.

The tool permits the use of radially inwardly positioned chip holding plates which are always the same, and independent of the diameter of the tool body, and further independent of the diameter of the hole to be cut. The radially outermost chip holding plate abuts immediately the adjacent chip holder plate, positioned in the common recess of the tool body. Thus, starting from a maximum size boring body, the specific diameter of the hole to be bored can be readily determined by grinding the chip holder plate for the radially outermost chip to proper size. The common mutually engaged abutment surfaces, positioned in the common recess in the tool body, result in excellent chip removal since collection of chips in cracks or gaps within the tool body, due to adjacently positioned but spaced chip holding plates, is avoided. The abutment surface of the radially outermost holding plate, which is to engage the next radially inwardly positioned cutter holding plate, can easily be ground to size so that, within a range of utility of a particular boring tool body, any desired diameter can be provided, and then bored or drilled. Lateral support is reliably obtained by the positioning of the cutter bits against each other, so that cutting forces which arise in operation are directly transferred to the body of the boring tools, and can thus be accepted by the chip holding plates, while maintaining the diameter of the cut with high accuracy.

The manufacture of the body is facilitated if the chips are formed with engagement surfaces and if the holder plates are formed with abutment surfaces which are axially directed and abut engagement surfaces formed in the tool body. The radially outermost chip holding plate, preferably, is a rectangular element; the chip holder plates which are radially more inwardly preferably are also rectangular, with the corners which lie innermost in the tool body being chamfered, so that the corners of the recess in which the plates fit need not be sharp but can be rounded, thus permitting formation of the recess in the tool body by a projecting milling tool.

DRAWINGS

Figure 1:
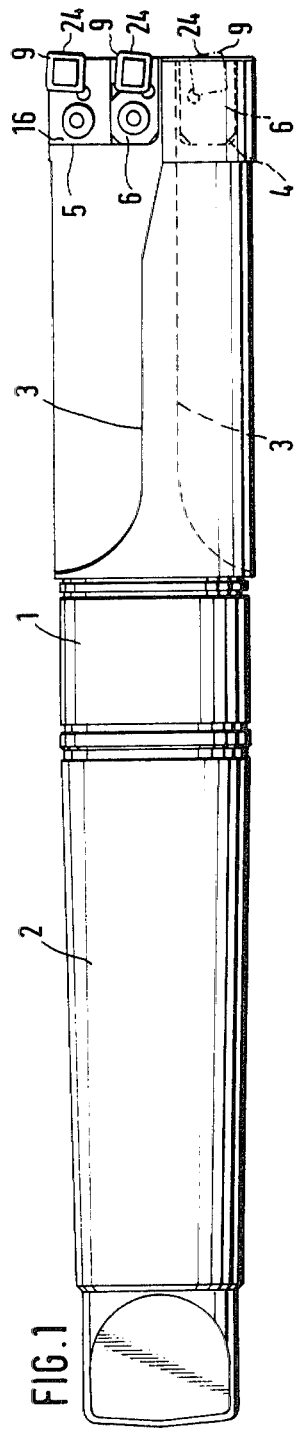
FIG. 1 is a side view of the boring tool.
Figure 2:
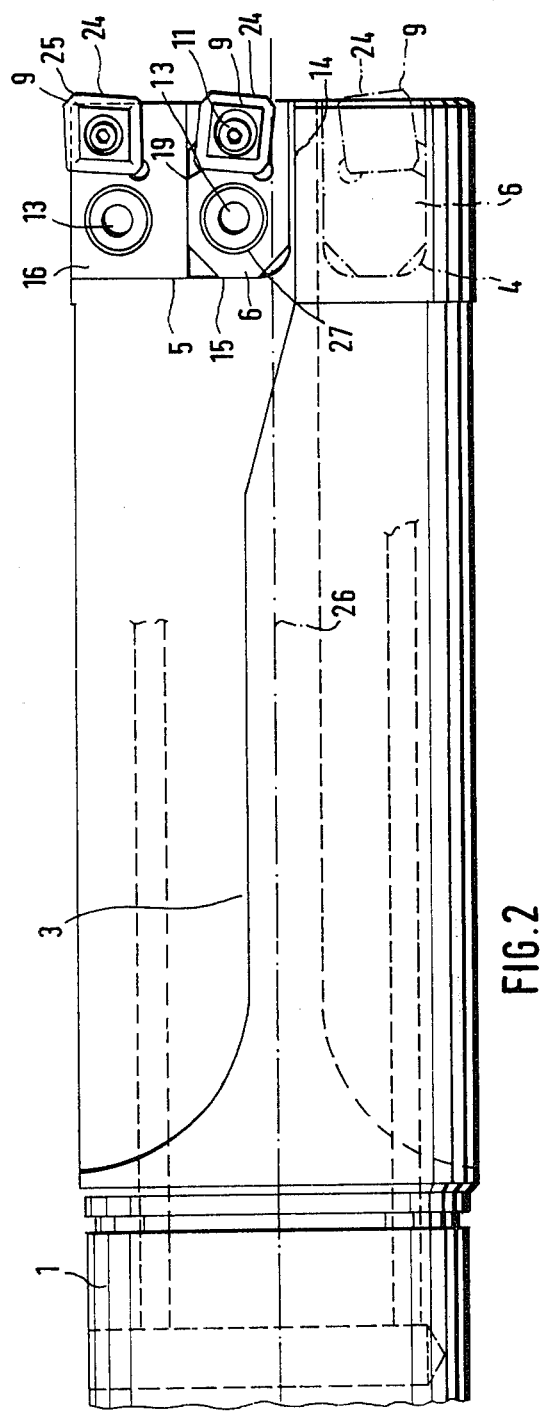
FIG. 2 is a fragmentary side view of the tool of FIG. 1, to a greatly enlarged scale.

The boring tool of FIGS. 1 and 2 has an essentially cylindrical body 1, having a taper, for example a Morse taper 2, at one end. In the embodiment shown, two flutes 3 are formed in body 1, which, at their end, have pocket-like recesses 4, 5 worked therein to receive cutting chips mounted on holder plates.

Figure 8:
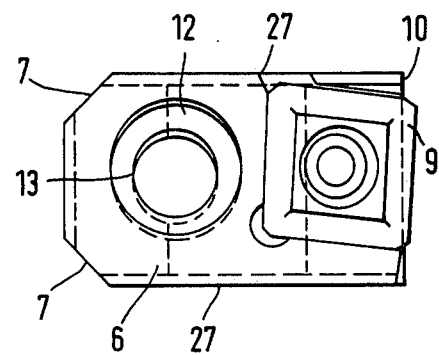
FIG. 8 is a plan view of a holder plate with a chip thereon for a radially inwardly positioned chip.
Figure 10:
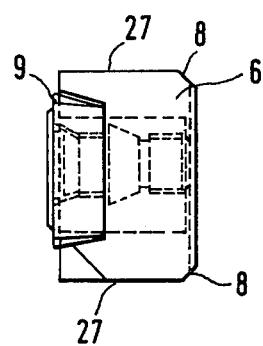
FIGS. 9 and 10 are top and left-side views of the plate of FIG. 8.
Figure 9:
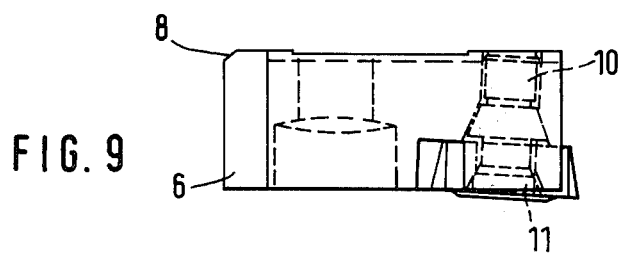

The recess 5—see, for examle, FIG. 2—carries a chip holder plate 6 which, as best seen in FIGS. 8 to 10, is in the form of a flat plate which is chamfered at opposite corners as seen at 7. The back side of the holder plate 8 is formed with a circumferentially extending chamfer 8.

The insert holder 6 is formed with a recess 10 which fits an approximately rhombus-shaped cutter chip 9. The side walls of the recess 10 hold the chip 9 in proper position. The chip 9 is a perforated chip, and clamped by means of a clamping head 11 formed on a clamping bolt 10' with the holder plate 6. The holder plate 6, itself, is secured in the recess 4 by a clamping bolt 13 which passes through a corresponding bore or hole 12 within the holder plate 6. The clamping screw 13 has its own clamping head which is so shaped that it tightens the holder plate 6 against the circumferences and back wall of the recess 4 and clamps it thereagainst.

Figure 7:
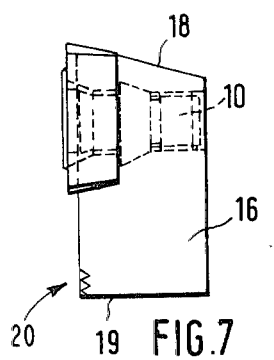
FIGS. 6 and 7 are left-side, and top-side views, respectively, of the plates of FIG. 5.
Figure 5:
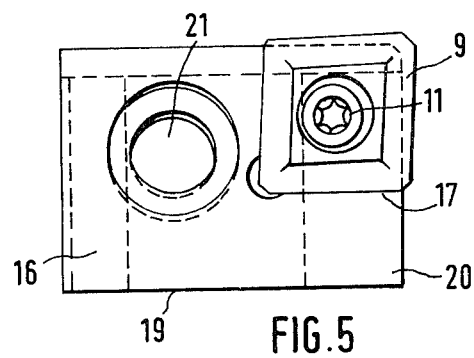
FIG. 5 is a plan view of the radially outermost holder plate for the tool of FIG. 1, with a chip thereon.
Figure 7A:
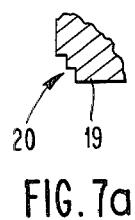
Figure 6:
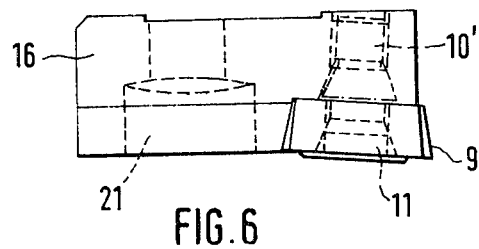

The other recess or pocket 5 formed in the base body 1 is so constructed that is extends towards the circumference of the base body. An insert holder 6, similar to that previously descirbed, is clamped by means of the clamping screw 13 within the recess 4—see FIG. 2—in such a way that it engages, and is seated securely on, an axially directed inner surface 14 and a lateral surface 15, extending at right angles to the axis 26 of the tool. A further holder 16 is seated in the recess 5. The holder 16, which is additional to the holder 6, is best seen in FIGS. 5 to 7. This holder 16, which forms a major element of the present invention, has a recess 17 to receive a cutting chip 9. The recess 17 has surfaces along the recess walls which support the cutter chip 9 in proper cutting position. The cutter chip 9 is held in the holder 16 in the same manner as cutter chips 9 are held in the holder 6, by a clamping screw 10' with a clamping head 11.

Figure 3:
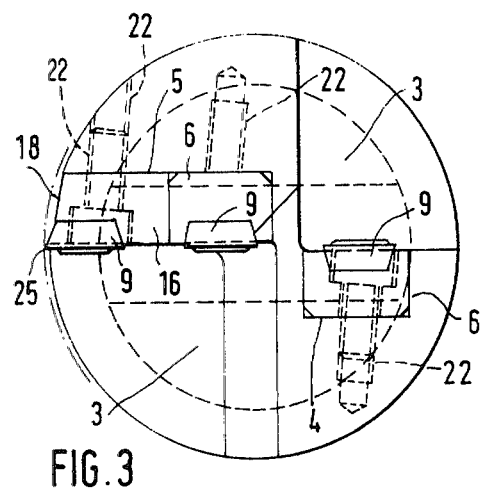
FIG. 3 is an end view of the tool of FIG. 2.

The insert holder 16 is an essentially rectangular plate which has an inclined narrow-sided surface 18—see FIG. 7—extending approximately tangentially to the circumference of the tool body 1 (see FIG. 3). At the opposite facing side, the insert element 16 has a flat abutment surface 19. A marginal region 20, extending parallel to the surface 19 and laterally with respect to the pocket 17 for the chip 9 is so formed that removal of a surface region parallel to the surface 19 is readily possible. For example, the region 20 may be longitudinally scored to form guide lines for grinding away a small portion from the chip holder plate 16 parallel to the surface 19 so as to bring the surface 19 slightly inwardly of that shown in FIGS. 5 and 7. In an alternative development, the surface region 20 may be shaped to be in stepped form.

The holder 16 is secured to the tool body 1 similar to the holder 6 by means of a clamping screw 13, extending through a bore 21 in the holder 16. The screw 13 is screwed into a tapped hole 22—see FIG. 3—similar to tapped holes for the remaining clamping screws or bolts 13 of the other holder plates 6.

The three chips 9, held on the tool body by the insert holders 6 and the insert holder 16 are so distributed across the radius of the tool body that the main cutting edges 24 overlap. The entire cutting width is thus distributed approximately uniformly over the main cutting edges 24 of the three cutting chips 9.

the radially outermost cutter chip 9 secured to the holder plate 16 extends with a cutting edge 25 to the outer circumference of the tool—see FIGS. 2 and 3. The cutter chip 9 which is in the same recess 5 as that of the insert plate 6 extends over the longitudinal axis 26 of the tool—see FIG. 2.

Each one of the insert holders 6 is formed laterally with two parallel, straight abutment surface 27—see FIGS. 8 to 10. When inserted into the tool body, the abutment surfaces 27 extend parallel to the tool axis 26. The abutment surfaces 27 of the insert holders 6 are positioned in the recess 5 such that the holders 6, 16 are engaged by the respective abutment surfaces 27 and 19, and further against the surface 15. The innermost holder plate 6 is also engaged against the surface 14 of the recess 5.

The tool can now be used for cutting a diameter determined by the position of the cutter chip 9 on the respective holder plates 6 and 16 at the right side of the tool of FIG. 2. If it is intended to use the tool to make holes which are slightly smaller, for example a few tenths of a millimeter, it is then only necessary to remove half the smaller distance from the surface 19 of the holder 16 by removing a portion, which can be predeformed, of the region 20, for example by scores, steps, or the like. This removal, for example by grinding, will then decrease the width of the holder 16 and move the cutting corner 25 of the radially outermost cutter chip 9 inwardly towards the center line 26. The insert holder 16 is clamped by the clamping screw 13. The bore 21 of the insert holder 16 has a greater diameter than the diameter of the clamping screw 13 which will bear with an essentially conical head thereon, so that, by slightly inclining the direction of the tapped bore 22—see FIG. 3—with respect to a transverse axis, the bolt 13 will always press the holder 16 reliably against the abutting surface 27 of the adjacent insert holder 6, even if the insert holder plate 16 has been made slightly smaller. The insert holder plate 16 is thus always pressed against the adjacent holder plate 6 which, in turn, is pressed against the abutment surface within the pocket formed in the tool body, so that the respective holder plates are all securely supported on the tool body.

The tool thus requires only two types of insert holders of simple plate-like shape, namely the one type shown in FIGS. 8 to 10, that is the insert 6 for the radially inwardly positioned holder, and another insert, 16, for the radially outermost holder (FIGS. 5 to 7). By suitable grinding of the abutment surface of the holder 16 in the zone 20, any desired width of such holders can be obtained, so that any desired diameter for the bore to be made by the tool can be obtained, within a certain range. It thus is sufficient to stock only two holder plate—holder plates 6 for the radially inwardly positioned cutting chips 9, and holder plates 16 for the radially outermost positioned cutting plate 9; the holder plates 16 could be supplied or re-used already with slightly different widths.

Figure 4:
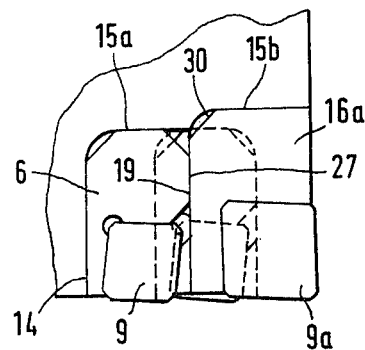
FIG. 4 is a fragmentary view, to a still more enlarged scale, of the outermost cutting portion of the tool end, similar to the tool end of FIG. 2.

The lateral side 15 of the pocket 5 is straight—see FIG. 2. The arrangement can be varied, see FIG. 4, by defining the pocket 5 laterally by two stepped surface regions 15a, 15b, which are adjacently positioned. This arrangement permits selection for the outermost holder plate 16a of a size which is different than that for the radially more inwardly positioined holder plate 6, and thus permits placement of a larger chip 9a on the outer holder plate 16a than the radially inwardly positioned chips 9. The shape of the holder plate 16a, in general, is the same as that described in connection with FIGS. 5 to 7. In this case, however, it is chamfered at the corner 30 so that the surfaces 15a, 15b can be milled in the tool body by a projecting milling cutter, thus permitting manufacture of the tool body in a simple manner and by standard machine tools. The adjacent insert elements 6, 16a abut each other on the abutment surfaces 19, 27. Attachment of the holder plates 6 and 16a is by clamping bolts as shown in described in connection with FIG. 2. These showings have been omitted from FIG. 4 for clarity. Attachment of the chips 9, 9a on the respective holder plates 6, 16a likewise has been omitted for clarity. It can be similar to that previously described in connection with the clamping bolts 10'.

Figure 12:
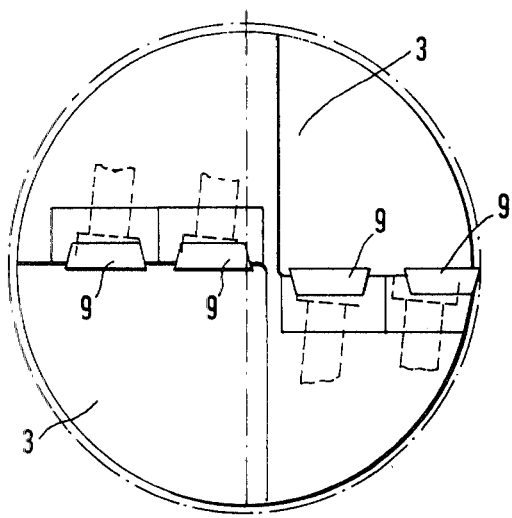
FIG. 12 is an end view of the tool of FIG. 11.
Figure 11:
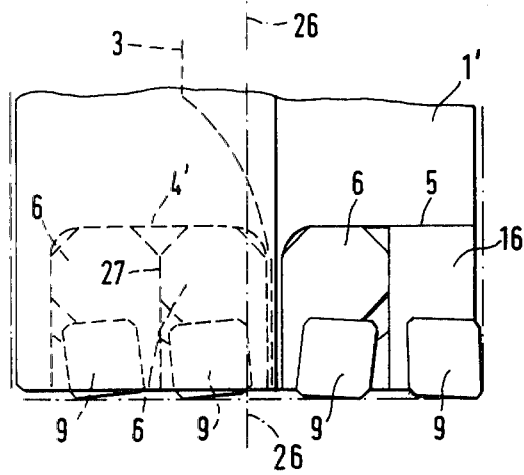
FIG. 11 is a fragmentary side view of another embodiment of the boring tool, and corresponding, approximately, to FIG. 2.

Embodiment of FIGS. 11, 12: The pocket 4' formed in the body 1' is made in such width that it can accept two adjacent holder plates 6, located nex to each other and abutted at the respective surfaces 27, and clamped thereagainst. Each one of the holders 6 retains a respective chip 9 in the same manner previously shown and described in connection with FIGS. 8 to 10. The other pocket 5 is similar to that previously described and explained in connection with FIGS. 1-3 and 4, and carries holder plates 6, 16 (or 16a). The arrangement of FIGS. 11 and 12 permits distributing the cutting width over four chips 9. The arrangement in accordance with FIGS. 1-3 distributes the overall cut over three chips 9 and their respective cutting edges 24. Other arrangements and relations of cutting chips distributed over the width of the tool are possible.

Various changes and modifications may be made, and features described in connection with any one of the embodiments may be used with any of the others, within the scope of the inventive concept.

I claim:

1. Boring tool having an elongated tool holder body (1, 2) having a cutting end portion formed with chip removal flutes (3), a plurality of cutter chips (9) located at the cutting end portion of the tool body and having main cutting edges (24) extending essentially transversely to the axis of the tool body;

chip holder plates (6, 16, 16a) located at, and removably secured to, the cutting end portion of the body, and having cutter chips, each, removably secured thereto.

the main cutting edges being positioned across the diameter of the tool in overlapping relation in which the radially innermost chip has a cutting edge extending over the axis of the tool body, and the radially outermost chip has a cutting edge defining the cutting diameter, wherein, in accordance with the invention, at least the chip holder plate (16, 16a) carrying the radially outermost chip, and the next adjacent chip holder plate (6) carrying a radially more inwardly positioned chip, have mutually engaged, common abutment surface (19, 27);

the body (1) is formed with a recess (5) in which said radially outermost chip holder plate and the next adjacent plate are commonly secured;

and wherein all radially inwardly positioned chip holder plates (6) are of equal size, the boring or drilling diameter being defined by the width of the radially outermost chip holder plate and the chip thereon.

2. Tool according to claim 1, including a removal zone (20) formed on the radially outermost chip holder plate (16, 16a) adjacent the abutment surface (19) thereof, and permitting removal of a portion of the material of the chip holder plate to reduce the width of the chip holder plate and thus determine the cutting diameter of the tool.

3. Tool according to claim 1, wherein the mutually engaged common abutment surfaces (19, 27) are plane surfaces extending parallel to the axis (26) of the tool holder body (1, 2).

4. Tool according to claim 1, wherein the tool holder body, in the region of the cutting end portion thereof, is formed with recessed pockets (4, 5) defining an abutment surface (14) extending in a direction parallel to the axis (26) of the tool holder body (1, 2), and a second abutment surface (15) extending transversely to said axis to permit positioning of the tool holder plates in said pockets and reliably support the tool holder plates on the tool holder body to accept the cutting forces, the mutually engaged common abutment surfaces (19, 27) transferring radially inwardly directed cutting forces on the radially outermost chip holder plate (16) to the next adjacent radially inner chip holder plate (6) and then to the engagement surface (14) formed by the pocket (5) in said body.

5. Tool according to claim 3, wherein the radially outermost chip holder plate (16) is an essentially rectangular plate.

6. Tool according to claim 1, wherein the radially inwardly positioned chip holder plates (6) are essentially rectangular plates formed with chamfered corners (7) at two adjacent corners on the narrow side of the rectangule.

7. Tool according to claim 2, wherein said zone (20) comprises deformations formed thereon providing guide lines for material removal from said radially outermost chip holder plate (16).

8. Tool according to claim 7, wherein said deformations comprise score lines.

9. Tool according to claim 7, wherein said deformations comprise steps.

* * * * *